INVENTOR.
Richard L. Easterwood
BY
Fishburn & Gold
ATTORNEYS

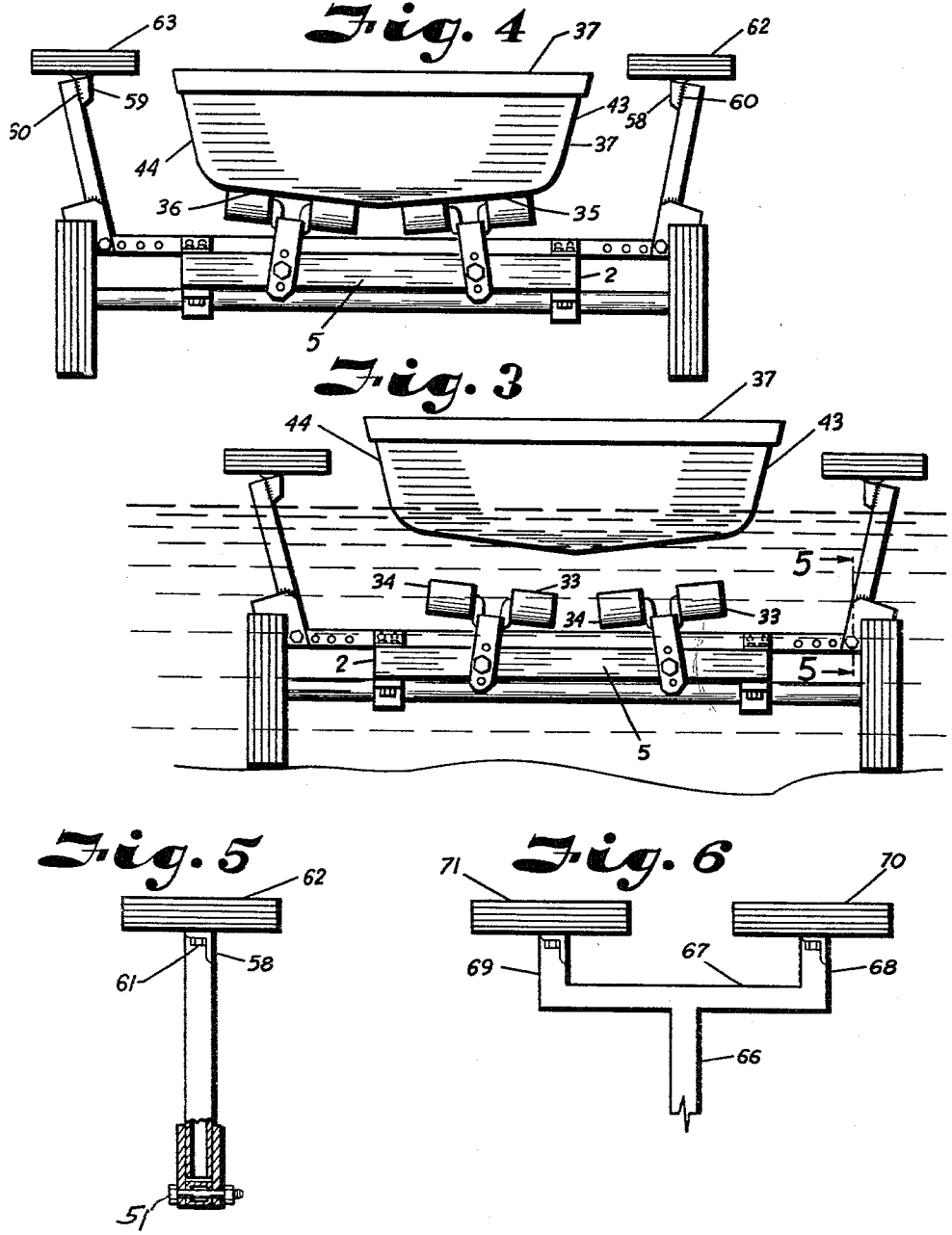

United States Patent Office 3,178,043
Patented Apr. 13, 1965

3,178,043
BOAT LOADING AND TRAILER DEVICE
Richard L. Easterwood, 3302 S. Grand, Independence, Mo.
Filed Jan. 28, 1963, Ser. No. 254,508
1 Claim. (Cl. 214—84)

This invention relates to a boat loading and trailer device, and more particularly to a trailer which may be submerged in a body of water and a boat driven thereon for loading and by pulling the trailer from the body of water the boat settles thereon for transportation.

In this fast growing industry there have been many devices developed for loading of boats and trailing the same behind vehicles. Some types of loaders require winches or other mechanical means for loading the boats. Many of them are cumbersome and require exact centering of the boats thereon and most of them requiring more than one person to load the boats.

It is the principal object of the present invention to provide a trailer for transporting a boat to a body of water, and particularly a trailer having guide members extending upwardly from the main body of the trailer and whereby the trailer is completely submerged in the water except for such guide means so that the boat may be driven over the trailer and engaged by said guide means and by pulling the trailer from the water while the boat is floating thereover will cause the boat to center on the trailer and continued movement of the trailer from the water will carry the boat therewith so that it may be transported.

Other objects of the present invention are to provide a wheel borne frame having rollers carried by the respective ends thereof for engaging the bottom of the boat when the boat is placed on the trailer; to provide a forward or reduced end portion on the frame having a trailer hitch for attachment to a vehicle; to provide an upright standard having a V-shaped member for receiving the narrow front end of a boat when the boat is guided onto the trailer; to provide a cross bar on the frame of the trailer forwardly of the supporting wheels having upwardly extending arms upon which are mounted in a horizontal position rollers or wheels for preventing the boat from swaying away from the trailer when it is being driven thereover or preventing the wind or waves from moving the boat sidewise of the trailer while it is being loaded and the trailer pulled from the water; and to provide a simply constructed trailer economical to manufacture and efficient in use.

Other objects and advantages of this invention will become apparent from the following description taken in connection with the accompanying drawings wherein are set forth by way of illustration and example certain embodiments of this invention.

FIG. 3 is a rear view of the trailer and boat while it is being loaded in the water.

FIG. 4 is a rear view after the boat has settled on the trailer and is out of the water.

FIG. 5 is an enlarged view with parts broken away taken on a line 5—5, FIG. 2 showing a standard and the guide wheel thereon.

FIG. 6 is a modified view of the standards showing two wheels thereon for guiding the boat while being loaded.

Figure 1:
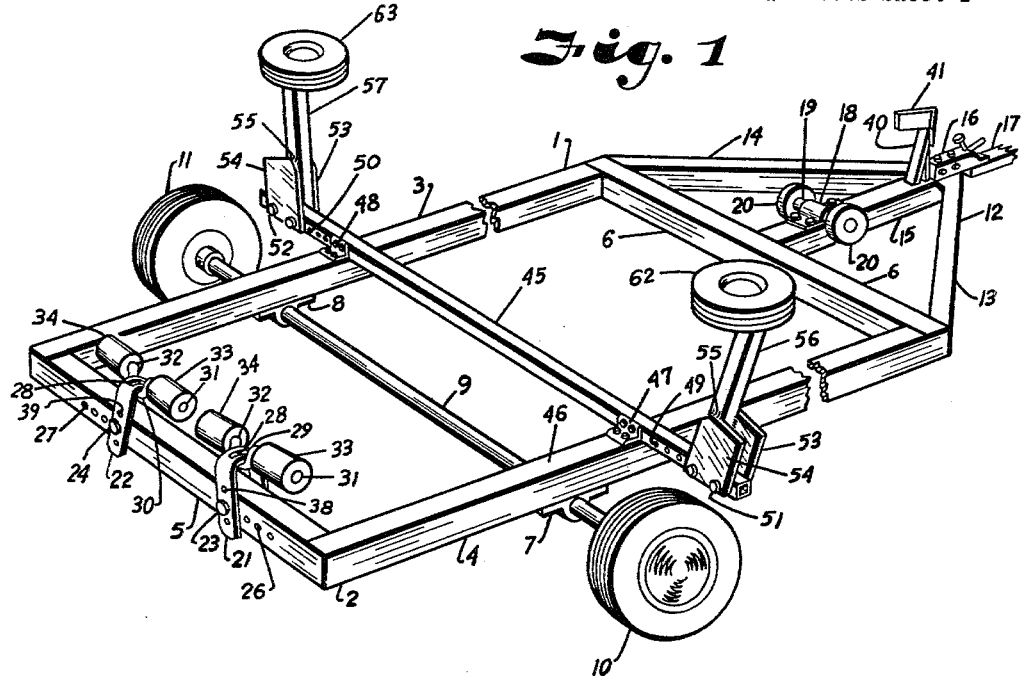
FIG. 1 is a perspective view of the trailer showing the frame side members in disconnected position.

Referring more in detail to the drawings:

The numeral 1 designates a trailer embodying the features of my invention having a frame 2 consisting of elongated side rails 3 and 4, a rear cross end member 5 and a front cross member or end 6. The frame may consist of angle members or other suitable framework structure. Attached to the underneath side of the side rails 3 and 4 towards the rear portion thereof are bearing members 7 and 8 for an axle 9 which extends outwardly from each side rail 3 and 4 of the frame upon which are mounted wheels 10 and 11.

Secured to the front end member 6 is a V-shaped frame portion 12 comprising sides 13 and 14 having the rear end welded or otherwise suitably secured to the cross member 6 and their front ends joined together by welding or other suitable means. Extending longitudinally midway through the V-shaped portion 12 is a bar 15 rigidly secured to the V portion of the framework 12 and to said cross member 6. Mounted on the forward end of the V-shaped frame 12 in alignment with the bar 15 is a trailer hitch 16 of usual construction which is adapted to be attached to a hitch bar 17 as is also the usual practice.

Mounted on the longitudinal bar 15 and spaced from the cross member 6 is a bearing 18 for a shaft 19 upon which a pair of rollers 20 are mounted for a purpose later described. Adjustably mounted on the rear end member 5 are U-shaped bracket members 21 and 22 by bolts 23 and 24 engaging in openings 26 and 27 in the end member 5. Secured to the underneath side in the U portion 28 of the brackets 21 and 22 are yoke members 29 and 30 having ends outwardly turned forming shafts 31 and 32 respectively upon which are mounted rollers 33 and 34 upon which the tapered bottom portions 35 and 36 of the boat 37 engage when the boat is supported on the trailer. The rollers 20 on the elongated member 15 at the front of the frame or structure 12 engages the boat of the bottom near the front end thereof so that the boat may be anchored on the rollers by any suitable means (not shown). The bracket members 21 and 22 have a plurality of openings 38 and 39 so that the brackets may be adjusted vertically on the end member 5 as desired as well as laterally to fit boats of different size and the contour of the bottom near the rear end thereof.

Rigidly mounted upon the forward end of the longitudinal bar 15 of the framework 12 is an upwardly extending standard 40 and rigidly mounted on the upper end thereof by welding or other suitable means is a V-shaped member 41 for receiving the forward pointed end 42 of the boat 37 which has the usual sides 43 and 44 to form a stop for the boat when it is floated over the trailer and to hold the front end from lateral movement in transit.

Mounted transversely of the frame 2 forwardly of the wheels 10 and 11 is a cross bar 45 and secured to the top flange 46 of the side members 3 and 4 by brackets or the like 47 and 48. The ends of the cross bar extend outwardly of the side members to substantially even with the wheels 10 and 11 as indicated in FIG. 4 and are provided with a plurality of openings 49 and 50 for receiving bolts 51 and 52 for adjustably mounting spaced bracket members 53 and 54. Mounted between the brackets 53 and 54 on each end of the cross bar 45 by welding or other suitable means as indicated at 55 are upwardly and slightly outwardly extending arms 56 and 57. Mounted upon the inside of the upper end of the arms 56 and 57 are brackets 58 and 59 by welding or other suitable means as indicated at 60. The upper end of the brackets are closed and provided with an opening (not shown) for a bolt or the like 61 forming a shaft upon which wheels or rollers 62 and 63 are mounted in a horizontal position.

Figure 2:
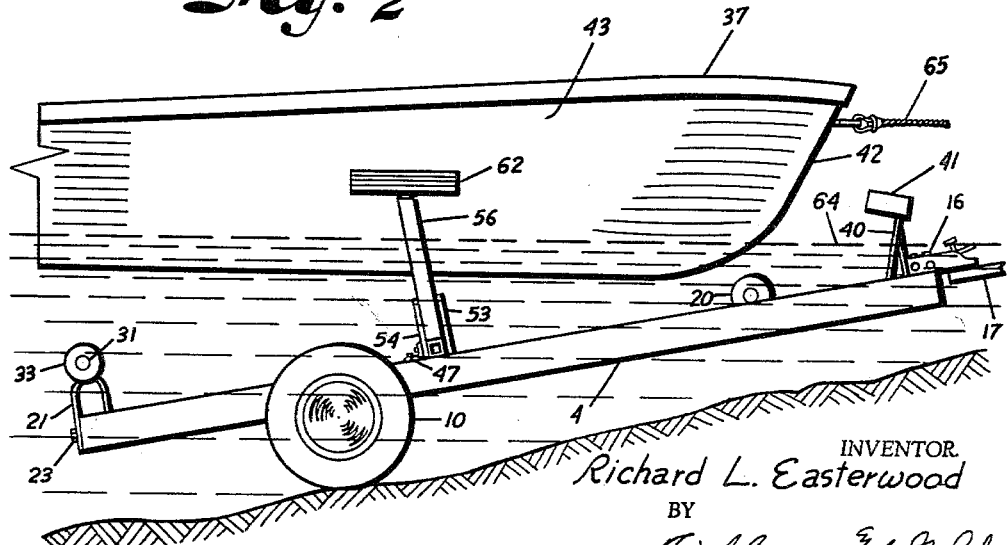
FIG. 2 is a side view showing the trailer submerged except for the guide members and a boat being driven or floated thereon.

The trailer 1 with the boat 37 anchored thereon may be transported behind a vehicle (not shown) to a body of water as indicated at 64, the boat loosened and the trailer backed rearwardly into the body of water until it is submerged so that it will float on the water and the trailer then pulled from underneath thereof. When it is desired to reload the boat the trailer is again backed into the water until it is all submerged except the wheels 62 and 63 and a small upper portion of the arms 56 and 57 and the V-shaped member 41 at the front of the trailer as illustrated in FIG. 2. The boat 37 may then be pulled by the cable 65 over the trailer while floating in the water or it may be driven by motor over the trailer and will be guided and centered on the trailer by the wheels 62 and 63. The front tapered end 42 of the boat will engage in the V-shaped member 41 and the boat may then be anchored against the V-shaped member by the cable 65 or other suitable means. The trailer may then be pulled from the water and the boat will settle on the front rollers 20 and the rear pair of rollers 33 and 34 respectively as illustrated in FIG. 4. The boat may then be more securely anchored on the trailer by suitable means (not shown) for transportation.

It will be obvious that should there be a wind or waves disturbing the water while the boat is being driven or pulled over the trailer one of the other of the rollers 62 or 63 will prevent the boat from moving sideways from over the trailer or, in other words, guide the boat so that it will remain over the trailer until the front end is engaged in the V-shaped member 41. The wheels 62 and 63 do not engage the boat in transit. They are only provided for guiding the boat while it is being loaded on the trailer in the water.

In FIG. 6 I have illustrated a modified form of standard and wheels for the cross bar 45. In this view there is shown an upright arm 66 having a cross arm 67 on its upper end and then upwardly extending outer end arms 68 and 69 upon which are mounted pairs of wheels 70 and 71 so that there will be a pair of wheels on each side of the boat for guiding the same over the trailer in loading while in the water. The wheels 70 and 71 are mounted on the upwardly extending arms 68 and 69 the same as described in connection with the wheels 62 and 63 and as shown in FIG. 5.

It will be noted that the brackets 53 and 54 are adjustable laterally on each end of the arm 45 and the U-shaped brackets 21 and 22 are also adjustable laterally on the end member 5 as well as vertically thereon to accommodate boats having different shaped bottoms.

It will be obvious from the foregoing that I have provided an improved guide means for a boat trailer which may be utilized for loading a boat by driving or pulling the same over the trailer when the trailer is completely submerged and only the guide means is above the surface of the water.

It is to be understood that while I have illustrated and described one form of my invention it is not to be limited to the specific form or arrangement of parts herein described and shown except insofar as such limitations are included in the claims.

What I claim and desire to secure by Letters Patent is:
In combination a boat trailer adapted to be submerged in a body of water comprising,
(a) a mobile rectangularly-shaped frame having side rails and an inwardly tapered front portion, said frame having front and rear cross members and a longitudinal bar in said tapered portion having one end attached to said front cross member, said rear cross bar having a plurality of laterally spaced openings therein,
(b) a normally horizontal cross member on said rails,
(c) means mounting said cross member on said rails at substantially the longitudinal center thereof, said cross member having a plurality of spaced openings transversely thereof outwardly of said rails, bracket members having spaced openings in their lower ends, bolts engaging in said openings in the brackets and in said cross member for adjusting said brackets laterally with respect to said frame,
(d) upwardly extending arms rigidly mounted between said bracket members and in an upwardly and outwardly angled position,
(e) rollers mounted on the upper ends of said arms in horizontal position for engaging a side of the boat to guide same over the trailer,
(f) laterally spaced rollers on the longitudinal bar of said frame engaging the front end of the boat, said last named rollers and the rollers on said upwardly extending arms being above the surface of the water when the trailer frame is submerged whereby upon pulling the trailer from the water the boat will rest on said trailer, and
(g) a pair of U-shaped brackets having aligned openings, means mounting said U-shaped brackets in said openings in said rear cross member for lateral swinging movement of said brackets, shafts having U-shaped portions engaging said U-shaped brackets, and spaced rollers mounted on said shafts for engaging the bottom of the boat as the boat is pulled over the trailer.

References Cited by the Examiner
UNITED STATES PATENTS

| | | | |
|---|---|---|---|
| 2,636,745 | 4/53 | Cartwright | 214—84 X |
| 2,827,304 | 3/58 | Backus | 214—505 X |
| 2,856,087 | 10/58 | Steber | 214—505 X |
| 2,889,945 | 6/59 | Holsclaw | 214—505 X |
| 2,948,423 | 8/60 | Capvano | 214—84 |
| 2,977,012 | 3/61 | Mavnvla | 214—505 |
| 3,021,969 | 2/62 | Peake et al. | 214—84 |
| 3,083,986 | 4/63 | Moody et al. | 214—506 X |

HUGO O. SCHULZ, *Primary Examiner.*
GERALD M. FORLENZA, *Examiner.*